(12) United States Patent
Lin

(10) Patent No.: US 11,743,916 B2
(45) Date of Patent: Aug. 29, 2023

(54) METHOD, APPARATUS AND SYSTEM FOR TRANSMITTING PERIODIC UPLINK INFORMATION/SIGNALS

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 83 days.

(21) Appl. No.: 17/400,825

(22) Filed: Aug. 12, 2021

(65) Prior Publication Data

US 2021/0377921 A1 Dec. 2, 2021

Related U.S. Application Data

(63) Continuation of application No. 16/606,123, filed as application No. PCT/CN2017/081304 on Apr. 20, 2017, now Pat. No. 11,115,971.

(51) Int. Cl.
*H04W 72/04* (2023.01)
*H04W 72/23* (2023.01)
*H04L 5/00* (2006.01)
*H04W 72/044* (2023.01)

(52) U.S. Cl.
CPC ........... *H04W 72/23* (2023.01); *H04L 5/0005* (2013.01); *H04L 5/0057* (2013.01); *H04L 5/0094* (2013.01); *H04W 72/044* (2013.01)

(58) Field of Classification Search
CPC . H04W 72/042; H04W 72/044; H04W 72/12; H04W 72/04; H04W 72/0413; H04L 5/0005; H04L 5/0057; H04L 5/0094; H04L 5/00; H04L 5/0051
See application file for complete search history.

(56) References Cited

U.S. PATENT DOCUMENTS

| 9,641,301 B2 | 5/2017 | Aiba et al. |
| 2014/0204961 A1* | 7/2014 | Hooli .................. H04W 72/535 370/476 |
| 2016/0056933 A1 | 2/2016 | Aiba et al. |

(Continued)

FOREIGN PATENT DOCUMENTS

| CN | 102378271 A | 3/2012 |
| CN | 104995980 A | 10/2015 |

(Continued)

OTHER PUBLICATIONS

Office Action of the Taiwanese application No. 107113264, dated Aug. 31, 2021.

(Continued)

*Primary Examiner* — John D Blanton
(74) *Attorney, Agent, or Firm* — Ladas & Parry LLP

(57) ABSTRACT

Provided are an uplink information transmission method, terminal and network device. The method includes: receiving configuration signaling indicating a transmission periodicity of uplink information; and when the number of uplink symbols in a transmission unit for transmitting the uplink information is smaller than a first numerical value, not transmitting the uplink information, where the first numerical value is a positive integer.

20 Claims, 5 Drawing Sheets

(56) References Cited

U.S. PATENT DOCUMENTS

| | | | |
|---|---|---|---|
| 2016/0080133 A1* | 3/2016 | Golitschek Edler von Elbwart ... | H04W 76/28 370/280 |
| 2017/0048041 A1 | 2/2017 | Yi et al. | |
| 2017/0048717 A1 | 2/2017 | Yoo et al. | |
| 2017/0208574 A1* | 7/2017 | Ramakrishna | H04L 5/0092 |
| 2019/0014598 A1* | 1/2019 | Yoshimura | H04L 5/0053 |
| 2019/0037483 A1 | 1/2019 | Li et al. | |
| 2019/0380125 A1* | 12/2019 | Yamamoto | H04L 5/0091 |

FOREIGN PATENT DOCUMENTS

| | | |
|---|---|---|
| CN | 105227266 A | 1/2016 |
| CN | 105530647 A | 4/2016 |
| CN | 105634710 A | 6/2016 |
| CN | 106255213 A | 12/2016 |
| CN | 106256095 A | 12/2016 |
| EP | 2765730 A2 | 8/2014 |
| EP | 2765730 A3 | 4/2015 |
| EP | 3448108 A1 | 2/2019 |
| JP | 2013098952 A | 5/2013 |
| RU | 2402170 C2 | 10/2010 |
| TW | 201635845 A | 10/2016 |
| WO | 2015137232 A1 | 9/2015 |
| WO | 2016028103 A1 | 2/2016 |

OTHER PUBLICATIONS

Supplementary European Search Report in the European application No. 21186024.2, dated Oct. 11, 2021.
Notice of Rejection Decision of the Japanese application No. 2019-558243, dated Nov. 12, 2021.
International Search Report in the international application No. PCT/CN2017/081304, dated Oct. 27, 2017.
Written Opinion of the International Search Authority in the international application PCT/CN2017/081304, dated Oct. 27, 2017.
Panasoni C: "Discussion on resource allocation for uplink control channel", 3GPP Draft: R1-1705454, 3rd Generation Partnership Project (3GPP) Mobile Competence Centre; 650. Route Des Lucioles; F-06921 Sophia-Antipolis Cedex; France, vol. RAN WG1, No. Spokane, USA; Apr. 3, 2017-Apr. 7, 2017 Apr. 2, 2017 (Apr. 2, 2017), XP051243584.
Supplementary European Search Report in the European application No. 17906261.7, dated Feb. 27, 2020.
Qualcomm, Ericsson, Nokia, "WF on TDD Configurations"; 3GPP TSG RAN WG1 #88bis Spokane, WA, U.S.A., Apr. 3-7, 2017 Agenda item 8.1.6.2, R1-1706775.
First Office Action of the Russian application No. 2019136319, dated Jun. 2, 2020.
First Office Action of the European application No. 17906261.7, dated Oct. 15, 2020.
First Office Action of the Chinese application No. 201911295690.7, dated Nov. 3, 2020.
Office Action of the Indian application No. 201917045540, dated Feb. 1, 2021.
First Office Action of the Korean application No. 10-2019-7031700, dated Feb. 10, 2021.
First Office Action of the Chilean application No. 201902994, dated Jan. 29, 2021.
First Office Action of the Canadian application No. 3060097, dated Dec. 1, 2020.
Written Opinion of the Singaporean application No. 11201909705U, dated Mar. 12. 2021.
Huawei, HiSilicon, "On the need for more flexible configurations related to CSI reporting", 3GPP TSG RAN WG1 Meeting #87 R1-1611237, Reno, USA, Nov. 14-18, 2016.
First Office Action of the Japanese application No. 2019-556243, dated May 21, 2021.
Second Office Action of the Chilean application No. 201902994, dated Jun. 18, 2021.
First Office Action of the U.S. Appl. No. 16/606,123, dated Dec. 14, 2020.
Notice of Allowance of the U.S. Appl. No. 16/606,123, dated May 6, 2021.
Notice of Supplementary Allowance of the U.S. Appl. No. 16/606,123, dated Jul. 9, 2021.
First Office Action of the Israeli application No. 270001, dated Jun. 8, 2022.
Second Office Action of the Australian application No. 2017410371, dated May 5, 2022.
Notice of Opposition of the European application No. 17906261.7, dated Apr. 22, 2022.
First Office Action of the Australian application No. 2017410371, dated Feb. 9, 2022.
"3rd Generation Partnership Project; Technical Specification Group Radio Access Network; Evolved Universal Terrestrial Radio Access (E-UTRA); Medium Access Control (MAC) protocol specification (Release 14)" 3GPP Technical Specification 36.321 V14.2.0, published on Mar. 22, 2017.
"3rd Generation Partnership Project; Technical Specification Group Radio Access Network; Evolved Universal Terrestrial Radio Access (E-UTRA); Radio Resource Control (RRC); Protocol specification (Release 14)" 3GPP Technical Specification 36.331 V14.2.0, published on Mar. 23, 2017.
ZTE, ZTE Microelectronics, "Basic Grant-free Transmission for URLLC" 3GPP TSG RAN WG1 Meeting #88 R1-1701594, Athens Greece Feb. 13-17, 2017.
Qualcomm Incorporated, "Resource Allocation for PUCCH" 3GPP TSG-RAN WG1 #88-bis R1-1705613, Apr. 3-7, 2017 Spokane, US.
Nokia, Alcatel-Lucent Shanghai Bell, "On the design of long PUCCH for NR" 3GPP TSG RAN WG1#88 R1-1703319 Athens, Greece, Feb. 13-17, 2017.
First Office Action of the Japanese application No. 2021-202349, dated Dec. 23, 2022.
First Office Action of the Mexican application No. MX/a/2019/012576, dated Jan. 18, 2023.

* cited by examiner

METHOD, APPARATUS AND SYSTEM FOR TRANSMITTING PERIODIC UPLINK INFORMATION/SIGNALS

CROSS REFERENCE TO RELATED APPLICATIONS

This application is a continuation application of U.S. patent application Ser. No. 16/606,123 which is the U.S. national stage of PCT Application No. PCT/CN2017/081304, filed on Apr. 20, 2017 and titled with METHOD, APPARATUS AND SYSTEM FOR TRANSMITTING PERIODIC UPLINK INFORMATION/SIGNALS, the contents of which are hereby incorporated by reference in their entirety.

TECHNICAL FIELD

Embodiments of the disclosure relate to the field of communication, and more particularly to a method, apparatus and system for transmitting periodic uplink information/signals.

BACKGROUND

Uplink information includes Channel State Information (CSI) and/or semi-persistent scheduling uplink data, and uplink signals include channel Sounding Reference Signals (SRSs). CSI refers to CSI of an uplink channel transmitted to a base station by a terminal, and is configured to indicate a channel state of the uplink channel of the terminal. According to different manners for triggering reporting, CSI has two types: periodic CSI and aperiodic CSI. Descriptions will be made below only with the condition that uplink information/signal includes periodic CSI as an example.

In a Long Term Evolution (LTE) system, a process that a terminal transmits periodic CSI to a base station roughly includes the following operations: the base station transmits a Channel State Information Reference Signal (CSI-RS) to the terminal; and correspondingly, the terminal measures CSI of an uplink channel according to the received CSI-RS and transmits the CSI to the base station through an uplink resource in the uplink channel according to a predetermined period.

SUMMARY

The embodiments of the disclosure provide a method, apparatus and system for transmitting periodic uplink information/signal. The following technical solutions are adopted.

According to a first aspect of the disclosure, a method for uplink information transmission is provided, which may be implemented by a terminal and may include: receiving configuration signaling indicating a transmission periodicity of uplink information; and when the number of uplink symbols in a transmission unit for transmitting the uplink information is smaller than a first numerical value, not transmitting the uplink information, the first numerical value being a positive integer.

According to a second aspect of the disclosure, a method for uplink information transmission is provided, which may be implemented by a network device and may include: sending configuration signaling indicating a transmission periodicity of uplink information; and, when the number of uplink symbols in a transmission unit for transmitting the uplink information is smaller than a first numerical value, not receiving the uplink information in the transmission unit, the first numerical value being a positive integer.

According to a third aspect of the disclosure, a terminal for uplink information transmission is provided, which includes: a processor, a transmitter and a receiver, the transmitter and the receiver being configured to transmit and receive information under control of the processor. The receiver is configured to receive configuration signaling, where the configuration signaling is used for indicating a transmission periodicity of uplink information. The processor is configured to, when the number of uplink symbols in a transmission unit for transmitting the uplink information is smaller than a first numerical value, control the transmitter to not transmit the uplink information, where the first numerical value is a positive integer.

According to a fourth aspect of the disclosure, a network device for uplink information transmission is provided, which includes a processor, a memory, a transmitter and a receiver. The memory is configured to store one or more than one instruction executable by the processor. The processor is configured to control the transmitter and receiver to transmit and receive information respectively and execute the instruction stored in the memory to implement the method for uplink information transmission according to the second aspect.

BRIEF DESCRIPTION OF DRAWINGS

In order to describe the technical solutions of the embodiments of the disclosure more clearly, the drawings required to be used in descriptions about the embodiments will be simply introduced below. It is apparent that the drawings described below are only some embodiments of the disclosure. Other drawings may further be obtained by those of ordinary skill in the art according to these drawings without creative work.

DETAILED DESCRIPTION

In order to make the purpose, technical solutions and advantages of the disclosure clearer, the implementations of the disclosure will further be described below in combination with the drawings in detail.

"First", "second" and similar words mentioned in the disclosure do not represent any sequence, number or significance but are only adopted to distinguish different components. Similarly, "a/an", "one" or similar words also do not represent limits to quantity but represent existence of at least one. "Connect", "mutually connected" or similar words are not limited to physical or mechanical connection but may include electrical connection, either direct or indirect.

"Module" mentioned in the disclosure usually refers to a process or instruction stored in a memory and capable of realizing some functions. "Unit" mentioned in the disclosure usually refers to a functional structure which is logically divided. A "unit" may be implemented completely by hardware or implemented by a combination of software and the hardware.

"Multiple" mentioned in the disclosure refers to two or more than two. "And/or" describes an association relationship between associated objects and represents that three relationships may exist. For example, A and/or B may represent three conditions: i.e., independent existence of A, existence of both A and B and independent existence of B. Character "I" usually represents that previous and next associated objects form an "or" relationship.

In the related art, the types of the frame structure of LTE/LTE-Advanced (LTE-A) include frame structure type 1 and frame structure type 2. The frame structure type 1 is configured for full duplex and half duplex Frequency Division Duplex (FDD). The frame structure type 2 is configured for Time Division Duplex (TDD).

Figure 1:
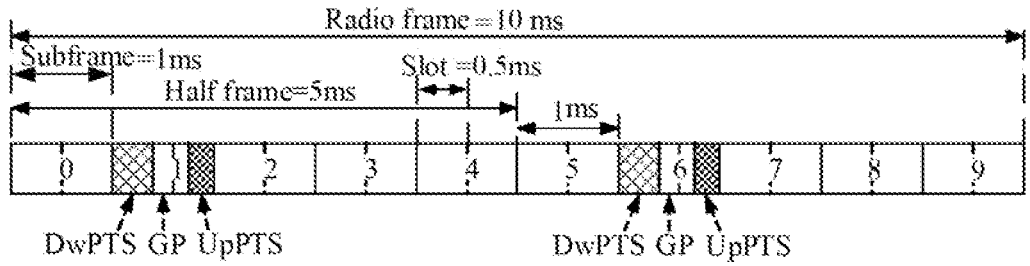
FIG. 1 is a schematic diagram of a frame structure type 2 according to the related art.

FIG. 1 is a schematic diagram of the frame structure type 2. A 10 ms radio frame consists of two half frames with lengths of 5 ms, each half frame consists of five subframes with lengths of 1 ms, and the five subframes include four ordinary subframes and a special subframe (configured to provide necessary guard time for downlink/uplink switching). The ordinary subframe consists of two 0.5 ms slots, and the special subframe includes three domains: a Downlink Pilot Time Slot (DwPTS) domain, a Guard Period (GP) domain and an Uplink Pilot Time Slot (UpPTS) domain. An uplink/downlink configuration of the frame structure type 2 is shown in Table 1, U represents an uplink subframe, D represents a downlink subframe and S represents a special subframe.

TABLE 1

| Uplink/downlink configuration | Uplink/downlink switching period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Thus it can be seen that a transmission direction (uplink or downlink) of each subframe and the number of uplink resources or the number of downlink resources in each subframe in an LTE/LTE-A system are fixed. While in a 5G system, unlike the LTE system where a fixed frame structure is used, a flexibly configured frame structure may be used in the 5G system.

Optionally, time-frequency resources in the 5G system may be divided according to different Transmission Time Intervals (TTIs). Optionally, the TTIs are 1 ms, 0.5 ms, 0.06 ms and the like. Each TTI may further be divided according to symbols, symbol groups, slots or subframes. For example, a TTI is divided into two slots, a TTI is divided into 14 symbols, and a TTI is even divided into four symbols or three symbols or two symbols and the like. In a communication system with a flexible frame structure, an uplink resource or downlink resource in each subframe is no longer fixed and a terminal 140 cannot use an uplink resource pre-configured by an access network device 120 or predetermined in a protocol to transmit periodic uplink information/signal. Therefore, a transmission manner for periodic uplink information/signal in LTE is no longer suitable for a communication system with a flexible frame structure.

On the basis of such a technical problem, the disclosure provides a method, apparatus and system for transmitting periodic uplink information/signal. References will be made to the following embodiments provided in FIG. 2 to FIG. 8.

First of all, the terms involved in the embodiments of the disclosure are introduced.

1: Periodic uplink information/signal: which refers to uplink information/signal that is transmitted to an access network device by a terminal in an uplink resource according to a predetermined time period. The periodic uplink information may be transmitted over a Physical Uplink Control Channel (PUCCH), or may be multiplexed with data and transmitted over a Physical Uplink Shared Channel (PUSCH). The periodic uplink information includes periodic CSI or semi-persistent scheduling uplink data, and the periodic uplink signal includes an SRS.

2: Periodic CSI: which refers to CSI of an uplink channel transmitted to an access network device side by the terminal according to the predetermined time period, and is configured to indicate a channel state of the uplink channel of the terminal. Optionally, the periodic CSI includes at least one of CRI information, RI information, wideband CQI information, wideband PMI information and first PMI information. Optionally, the periodic CSI further includes at least one of the following sub information: sub-band CQI information, second PMI information and Pre-coding Type Indicator (PTI) information.

3: Target periodic uplink information/signal: which refers to periodic uplink information/signal presently transmitted by a terminal, or, latest periodic uplink information/signal required to be sent.

4: Configuration parameter of periodic uplink information/signal: which is used to configure information about a periodic uplink information/signal transmission manner, and usually includes at least one of: a transmission period, an offset, a CSI feedback mode, a transmission mode and a physical resource indication. The transmission period is configured to indicate a time period of transmitting, by the terminal, periodic uplink information/signals to the access network device. The offset is configured to indicate an offset position of a target transmission unit in a radio frame. The feedback mode is configured to indicate a mode type of transmitting, by the terminal, the periodic CSI to the access network device. The physical resource indication is configured to indicate at least one of a time-domain resource, frequency-domain resource and code-domain resource of the target transmission unit.

5: Target transmission unit: which refers to a transmission unit initially determined to transmit target periodic uplink information/signal. The target transmission unit is not always finally determined to be the transmission unit configured to transmit the target periodic uplink information/signal. Optionally, the target transmission unit may be a subframe or a slot.

6: Uplink symbol quantity: which refers to the amount of an uplink symbol of the target transmission unit in a time domain. Optionally, when the target transmission unit is a normal uplink subframe or a normal uplink slot, the number of uplink symbols may be 7.

It is to be noted that part of related terms involved in the embodiments of the disclosure may refer to corresponding related descriptions in Chapter 7.2 in TS 36.213 of the 3rd Generation Partnership Project (3GPP) protocol, for example, the periodic CSI, the CRI information, the RI information, the wideband CQI information, the wideband PMI information and the first PMI information, and will not be elaborated herein.

Figure 2:
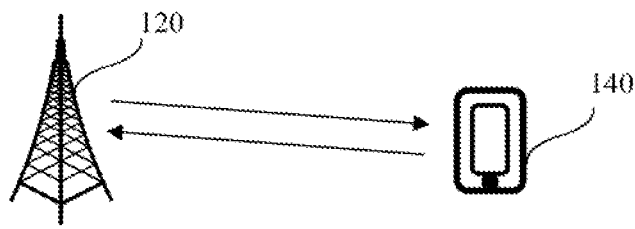
FIG. 2 is a structure diagram of a mobile communication system according to an exemplary embodiment of the disclosure.

Referring to FIG. 2, a structure diagram of a mobile communication system according to an exemplary embodiment of the disclosure is shown. The mobile communication system may be an LTE system, may also be an LTE-A system, or may further be a 5G system. The 5G system is also called a New Radio (NR) system. There are no limits made thereto in the embodiment. The mobile communication system includes an access network device 120 and a terminal 140.

The access network device 120 may be a base station. The base station may be configured to mutually convert a received radio frame and an Internet Protocol (IP) packet message, and may further coordinate the attribute management of an air interface. For example, the base station may be an Evolutional Node B (eNB or e-NodeB) in LTE, or, a base station adopting a central distributed architecture in the 5G system. The access network device 120, when adopting the central distributed architecture, usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are arranged in the CU. A physical protocol stack is arranged in the DU. A specific implementation manner of the access network device 120 is not limited in the embodiment of the disclosure. Optionally, the access network device may further include a Home eNB (HeNB), a relay, a Pico and the like.

The access network device 120 establishes a wireless connection with the terminal 140 through a wireless air interface. Optionally, the wireless air interface is a 5G-standard-based wireless air interface, for example, the wireless air interface is NR; or, the wireless air interface may also be a wireless air interface based on a next-generation mobile communication network technology standard of 5G; or, the wireless air interface may also be a 4th-Generation (4G)-standard (LTE system)-based wireless air interface. The access network device 120 may receive uplink data transmitted by the terminal 140 through the wireless connection.

The terminal 140 may refer to a device that performs data communication with the access network device 120. The terminal 140 may communicate with one or more core networks through a Radio Access Network (RAN). The terminal 140 may be a mobile terminal, for example, a mobile phone (or called a "cell" phone), and a computer with a mobile terminal, which may be, for example, a portable, pocket, handheld, computer-embedded or vehicle-mounted mobile device, for example, a subscriber unit, a subscriber station, a mobile station, a mobile, a remote station, an access point, a remote terminal, an access terminal, a user terminal, a user agent, a user device or User Equipment (UE). Optionally, the terminal 140 may also be a relay device, which will not be limited in the embodiment. The terminal 140 may transmit the uplink data to the access network device 120 through the wireless connection with the access network device 120.

Optionally, the access network device 120 transmits configuration signaling to the terminal 140, the configuration signaling containing a configuration parameter of periodic uplink information/signal. Correspondingly, the terminal 140 determines a target transmission unit according to the configuration parameter in the received configuration signaling and transmits or cancels target periodic uplink information/signal according to the number of the uplink symbol in the target transmission unit.

It is to be noted that the mobile communication system shown in FIG. 2 may include multiple access network devices 120 and/or multiple terminals 140, FIG. 2 shows one access network device 120 and one terminal 140 for exemplary description but there are no limits made thereto in the embodiment.

Figure 3A:
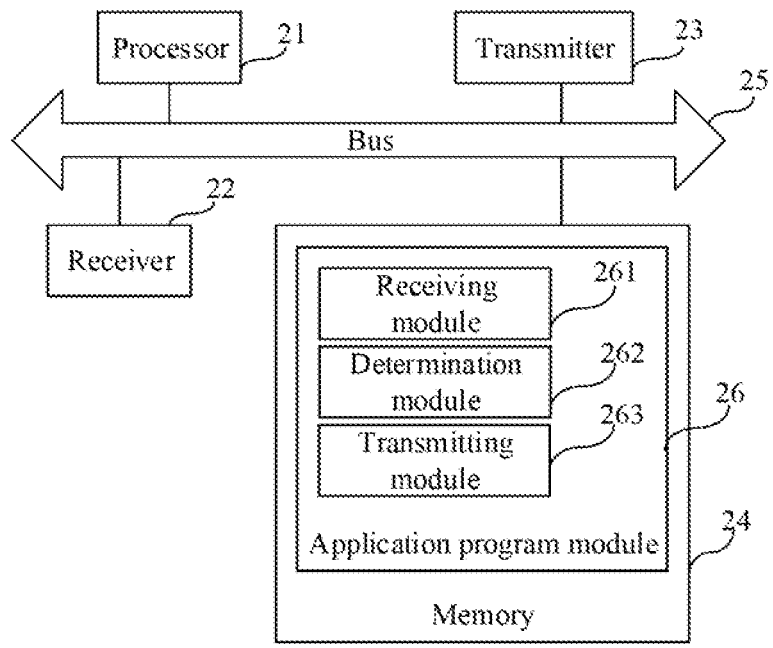
FIG. 3A is a structure diagram of a terminal according to an exemplary embodiment of the disclosure.

Referring to FIG. 3A, a structure diagram of a terminal according to an exemplary embodiment is shown. The terminal may be the terminal 140 in the mobile communication system shown in FIG. 2. Descriptions are made in the embodiment with the condition that the terminal 140 is UE in an LTE system or a 5G system as an example. The terminal includes a processor 21, a receiver 22, a transmitter 23, a memory 24 and a bus 25.

The processor 21 includes one or more than one processing core, and the processor 21 runs software programs and modules, thereby executing various function applications and information processing.

The receiver 22 and the transmitter 23 may be implemented as a communication component, the communication component may be a communication chip, and the communication chip may include a receiving module, a transmission module, a modem module and the like, and is configured to modulate and/or demodulate information and receive or transmit the information through a wireless signal.

The memory 24 may be connected with the processor 21 through the bus 25.

The memory 24 may be configured to store the software programs and the modules.

The memory 24 may store an application program module 26 for at least one function. The application program module 26 may include a receiving module 261, a determination module 262 and a Transmitting module 263.

The processor 21 is configured to execute the receiving module 261 to realize a function of a related receiving operation in each method embodiment. The processor 21 is configured to execute the determination module 262 to realize a function of a related determination operation in each method embodiment. The processor 21 is configured to execute the Transmitting module 263 to realize a function of a related transmission operation in each method embodiment.

In addition, the memory 24 may be implemented by a volatile or nonvolatile storage device of any type or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

Figure 3B:
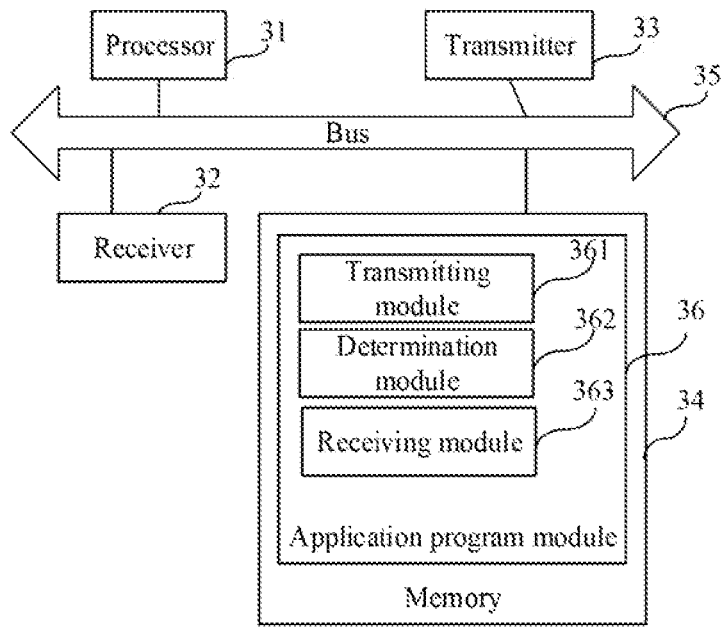
FIG. 3B is a structure diagram of an access network device according to an exemplary embodiment of the disclosure.

Referring to FIG. 3B, a structure diagram of an access network device according to an exemplary embodiment is shown. The access network device may be the access network device 120 in the mobile communication system shown in FIG. 2. Descriptions are made in the embodiment with the condition that the network 120 is an eNB in an LTE system or a gNB in a 5G system as an example. The access network device includes a processor 31, a receiver 32, a transmitter 33, a memory 34 and a bus 35.

The processor 31 includes one or more than one processing core, and the processor 31 runs software programs and modules, thereby executing various function applications and information processing.

The receiver 32 and the transmitter 33 may be implemented as a communication component, the communication component may be a communication chip, and the communication chip may include a receiving module, a transmission module, a modem module and the like, and is configured to modulate and demodulate information and receive or transmit the information through a wireless signal.

The memory 34 may be connected with the processor 31 through the bus 35.

The memory 34 may be configured to store the software programs and the modules.

The memory 34 may store an application program module 36 for at least one function. The application program module 36 may include a Transmitting module 361, a determination module 362 and a receiving module 363.

The processor 31 is configured to execute the transmitting module 361 to realize a function of a related transmission operation in each method embodiment. The processor 31 is configured to execute the determination module 362 to realize a function of a related determination operation in each method embodiment. The processor 31 is configured to execute the receiving module 363 to realize a function of a related receiving operation in each method embodiment.

In addition, the memory 34 may be implemented by a volatile or nonvolatile storage device of any type or a combination thereof, for example, an SRAM, an EEPROM, an EPROM, a PROM, a ROM, a magnetic memory, a flash memory, a magnetic disk or an optical disk.

Figure 4:
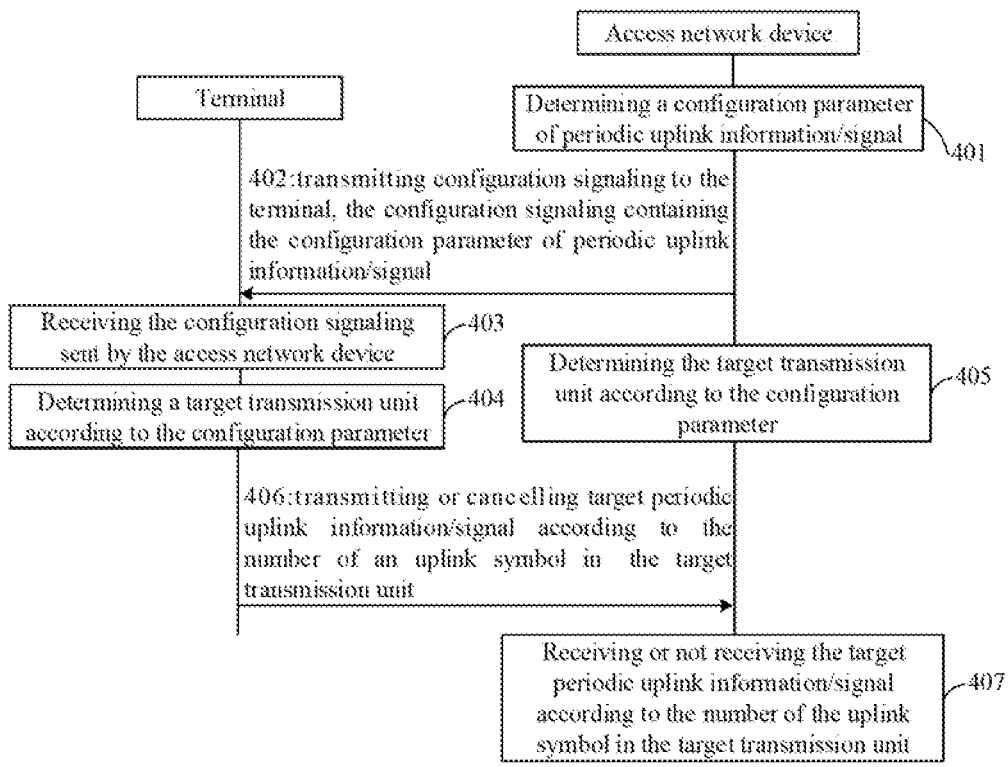
FIG. 4 is a flowchart of a periodic uplink information/signal transmission method according to an exemplary embodiment of the disclosure.

Referring to FIG. 4, a flowchart of a periodic uplink information/signal transmission method according to an exemplary embodiment of the disclosure is shown. The method is applied to the mobile communication system shown in FIG. 2. The method includes the following operations.

In the operation 401, an access network device determines a configuration parameter of periodic uplink information/signal.

For example, periodic uplink information/signal is periodic CSI. The configuration parameter of periodic uplink information/signal determined by the access network device includes at least one of: a transmission period, an offset, a CSI feedback mode, a transmission mode and a physical resource indication.

Optionally, the configuration parameter includes at least one of parameters shown in Table 2, and is not limited to each parameter shown in Table 2. It is to be understood that each parameter in Table 2 has a corresponding serial number and description information, but the serial number and the description information are not part of the corresponding parameter, and adding the serial number and the description information is only for convenient description.

TABLE 2

| Serial number | Configuration parameter | Description information |
| --- | --- | --- |
| 1 | Transmission period | Time period of transmitting periodic uplink information/signal. The value of the transmission period is any one of 2, 5, 10 and 30 ms. The value of the transmission period is not limited in the embodiment. |
| 2 | offset | offset of the target transmission unit in a radio frame. For example, the offset "2" is configured to indicate that the "second" subframe in a radio frame (including totally 10 subframes, i.e., "zeroth" to "ninth" subframes) is the target transmission unit. |
| 3 | Transmission mode | Including, but not limited to, the nine transmission modes shown in Table 3. |
| 4 | CSI feedback mode | Different feedback modes are adopted for different transmission modes. For example, in the transmission mode 4 "closed-loop spatial multiplexing", the feedback mode includes, but not limited to, the feedback modes shown in Table 4. Feedback methods and contents in other transmission modes are usually simplifications of the feedback mode corresponding to the mode 4. |
| 5 | Physical resource indication | Configured to indicate at least one of a resource in the time domain, a resource in the frequency domain, a resource in the space domain and a code-domain resource. Descriptions are made in the disclosure only with the condition that the physical resource indication includes a starting index corresponding to a Physical Resource Block (PRB) in the frequency domain as an example. |
| 6 | Duration | Duration for resource allocation. For example, second, one-time triggering or infinitely great is taken as a unit. |

TABLE 3

| Transmission type | Transmission mode |
| --- | --- |
| Mode 1 | Single-antenna port |
| Mode 2 | Transmit diversity |
| Mode 3 | Open-loop spatial multiplexing |
| Mode 4 | Closed-loop spatial multiplexing |
| Mode 5 | Multi-user Multiple Input Multiple Output (MIMO) |
| Mode 6 | Codebook-based beamforming |
| Mode 7 | Single-stream transmission |
| Mode 8 | Double-stream transmission |
| Mode 9 | Multi-stream transmission |

TABLE 4

| Feedback type | Feedback content | Mode state | Mode 1-1 (bits/BP*) | Mode 2-1 (bits/BP*) | Mode 1-0 (bits/BP*) | Mode 2-0 (bits/BP*) |
|---|---|---|---|---|---|---|
| 1 | Sub-band CQI | RI = 1 | NA | 4 + L | NA | 4 + L |
| | | RI > 1 | NA | 7 + L | NA | 4 + $L^1$ |
| | | | | | | 7 + $L^2$ |
| 1a | Sub-band CQI/second PMI | 8 antenna ports or 8/12/16/20/24/28/32 antenna ports of codebook configuration Config = {2, 3, 4}, RI = 1 | NA | 8 + L | NA | NA |
| | | 8 antenna ports or 8/12/16/20/24/28/32 antenna ports of codebook configuration Config = {2, 3, 4}, 1 < RI < 5 | NA | 9 + L | NA | NA |
| | | 8 antenna ports or 8/12/16/20/24/28/32 antenna ports of codebook configuration Config = {1, 2, 3, 4}, RI > 4 | NA | 7 + L | NA | NA |
| | | 8/12/16/20/24/28/32 antenna ports of codebook configuration Config = 1, RI = 1 | NA | 6 + L | NA | NA |
| | | 8/12/16/20/24/28/32 antenna ports of codebook configuration Config = 1, RI = 2 | NA | 9 + L | NA | NA |
| | | 8/12/16/20/24/28/32 antenna ports of codebook configuration Config = 1, 2 < RI < 5 | NA | 8 + L | NA | NA |
| | | 4 antenna ports, RI = 1 | NA | 8 + L | NA | NA |
| | | 4 antenna ports, 1 < RI ≤ 4 | NA | 9 + L | NA | NA |
| 2 | Wideband CQI/PMI | 2 antenna ports, RI = 1 | 6 | 6 | NA | NA |
| | | 4 antenna ports, RI = 1, Note[5] | 8 | 8 | NA | NA |
| | | 2 antenna ports, RI > 1 | 8 | 8 | NA | NA |
| | | 4 antenna ports, RI > 1, Note[5] | 11 | 11 | NA | NA |
| | | 4 antenna ports, RI = 1, Note[6] | 7 | 7 | NA | NA |
| | | 4 antenna ports, RI = 2, Note[6] | 10 | 10 | NA | NA |
| | | 4 antenna ports, RI = 3, Note[6] | 9 | 9 | NA | NA |
| | | 4 antenna ports, RI = 4, Note[6] | 8 | 8 | NA | NA |
| | | 8 antenna ports, RI = 1 | 8 | 8 | NA | NA |
| | | 8 antenna ports, 1 < RI < 4 | 11 | 11 | NA | NA |
| | | 8 antenna ports, RI = 4 | 10 | 10 | NA | NA |
| | | 8 antenna ports, RI > 4 | 7 | 7 | NA | NA |
| 2a | First PMI | 8 antenna ports, RI < 3 | NA | 4 | NA | NA |
| | | 8 antenna ports, 2 < RI < 8 | NA | 2 | NA | NA |
| | | 8 antenna ports, RI = 8 | NA | 0 | NA | NA |
| | | 4 antenna ports, 1 ≤ RI ≤ 2 | NA | 4 | NA | NA |
| | | 4 antenna ports, 2 ≤ RI ≤ 4 | NA | NA | NA | NA |
| | | 8/12/16/20/24/28/32 antenna ports of codebook configuration Config = 1, 1 ≤ RI ≤ 8 | Note[3] | Note[3] | NA | NA |
| | | 8/12/16/20/24/28/32 antenna ports of codebook configuration Config = {2, 3, 4} | Note[4] | Note[4] | NA | NA |
| | | 4 antenna ports, 1 ≤ RI ≤ 2 | 3 | NA | NA | NA |
| | | 4 antenna ports, 3 ≤ RI ≤ 4 | 0 | NA | NA | NA |
| | | 8 antenna ports, 1 ≤ RI ≤ 2 | 6 | NA | NA | NA |
| | | 8 antenna ports, 3 ≤ RI ≤ 4 | 2 | NA | NA | NA |
| | | 8 antenna ports, 5 ≤ RI ≤ 8 | 0 | NA | NA | NA |
| | | 8/12/16/20/24/28/32 antenna ports, 1 ≤ RI ≤ 8 | Note[7] | NA | NA | NA |
| 2b | Wideband CQI/second PMI | 8 antenna ports or 8/12/16/20/24/28/32 antenna ports of codebook configuration Config = {2, 3, 4}, RI = 1 | 8 | 8 | NA | NA |
| | | 8 antenna ports or 8/12/16/20/24/28/32 antenna ports of codebook configuration Config = {2, 3, 4}, 1 < RI < 4 | 11 | 11 | NA | NA |
| | | 8 antenna ports or 8/12/16/20/24/28/32 antenna ports of codebook configuration Config = {2, 3, 4}, RI = 4 | 10 | 10 | NA | NA |
| | | 8 antenna ports or 8/12/16/20/24/28/32 antenna ports of codebook configuration Config = {1, 2, 3, 4}, RI > 4 | 7 | 7 | NA | NA |

TABLE 4-continued

| Feedback type | Feedback content | Mode state | Mode 1-1 (bits/BP*) | Mode 2-1 (bits/BP*) | Mode 1-0 (bits/BP*) | Mode 2-0 (bits/BP*) |
|---|---|---|---|---|---|---|
| | | 4 antenna ports, RI = 1 | 8 | 8 | NA | NA |
| | | 4 antenna ports, 1 < RI ≤ 4 | 11 | 11 | NA | NA |
| | | 8/12/16/20/24/28/32 antenna ports of codebook configuration Config = 1, RI = 1 | 6 | 6 | NA | NA |
| | | 8/12/16/20/24/28/32 antenna ports of codebook configuration Config = 1, RI = 2 | 9 | 9 | NA | NA |
| | | 8/12/16/20/24/28/32 antenna ports of codebook configuration Config = 1, 2 < RI < 5 | 8 | 8 | NA | NA |
| | | 4/8 antenna ports or 8/12/16/20/24/28/32 antenna ports, RI = 1 | 10 | NA | NA | NA |
| | | 4/8 antenna ports or 8/12/16/20/24/28/32 antenna ports, RI = 2 | 11 | NA | NA | NA |
| 2c | Wideband CQI/first PMI/second PMI | 8 antenna ports, RI = 1 | 8 | NA | NA | NA |
| | | 8 antenna ports, 1 < RI ≤ 4 | 11 | NA | NA | NA |
| | | 8 antenna ports, 4 < RI ≤ 7 | 9 | NA | NA | NA |
| | | 8 antenna ports, RI = 8 | 7 | NA | NA | NA |
| | | 4 antenna ports, RI = 1 | 8 | NA | NA | NA |
| | | 4 antenna ports, 1 < RI ≤ 4 | 11 | NA | NA | NA |
| 3 | RI | 2/4 antenna ports, 2-layer spatial multiplexing | 1 | 1 | 1 | 1 |
| | | 8 antenna ports, 2-layer spatial multiplexing | 1 | NA | NA[1] $1^2$ | NA[1] $1^2$ |
| | | 4 antenna ports, 4-layer spatial multiplexing | 2 | 2 | 2 | 2 |
| | | 8 antenna ports, 4-layer spatial multiplexing | 2 | NA | NA[1] $2^2$ | NA[1] $2^2$ |
| | | 8-layer spatial multiplexing | 3 | NA | NA[1] $3^2$ | NA[1] $3^2$ |
| | | 12/16/20/24/28/32 antenna ports, 2-layer spatial multiplexing | 1 | NA | NA | NA |
| | | 12/16/20/24/28/32 antenna ports, 4-layer spatial multiplexing | 2 | NA | NA | NA |
| | | 12/16/20/2-4728/32 antenna ports, 8-layer spatial multiplexing | 3 | NA | NA | NA |
| 4 | Wideband CQI | RI = 1 or RI > 1, no PMI/RI | NA | NA | 4 | 4 |
| | | RI = 1, no PMI | NA | NA | 4 | 4 |
| | | RI > 1, no PMI | NA | NA | 7 | 7 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| | | 4 antenna ports, 2-layer spatial multiplexing | 4 | | | |
| | | 4 antenna ports, 4-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |
| | | 4 antenna ports, 2-layer spatial multiplexing | NA | 2 | NA | NA |
| | | 4 antenna ports, 4-layer spatial multiplexing | NA | 3 | NA | NA |
| 7 | CRI/RI | 2-layer spatial multiplexing | k + 1 | k + 1 | k + 1 | k + 1 |
| | | 4-layer spatial multiplexing | k + 2 | k + 2 | k + 2 | k + 2 |
| | | 8-layer spatial multiplexing | k + 3 | k + 3 | k + 3 | k + 3 |
| 8 | CRI/RI/first PMI | 2-layer spatial multiplexing | k + 4 | NA | NA | NA |
| | | 4 and 8-layer spatial multiplexing | k + 5 | NA | NA | NA |
| 9 | CRI/RI/PTI | 2-layer spatial multiplexing | NA | k + 2 | NA | NA |
| | | 4-layer spatial multiplexing | NA | k + 3 | NA | NA |
| | | 8-layer spatial multiplexing | NA | k + 4 | NA | NA |
| 10 | CRI | No PMI/RI | NA | NA | k | k |
| 11 | RI/RPI | 2-layer spatial multiplexing | 3 | NA | NA | NA |
| | | 4-layer spatial multiplexing | 4 | NA | NA | NA |
| | | 8-layer spatial multiplexing | 5 | NA | NA | NA |

Optionally, the access network device generates configuration signaling according to the determined configuration parameter of the periodic uplink information/signal.

In the operation 402, the access network device transmits configuration signaling to a terminal, the configuration signaling containing the configuration parameter of the periodic uplink information/signal.

Optionally, the access network device transmits the determined configuration signaling to the terminal through high-layer signaling, or transmits the determined configuration signaling to the terminal through Physical Downlink Control Channel (PDCCH) signaling. The configuration signaling transmitted by the access network device through the high-layer signaling is cell specific configuration signaling or terminal specific configuration signaling, and the high-layer signaling adopted by the access network device may be Layer-3 (L3) and Layer-2 (L2) signaling, for example, Radio Resource Control (RRC) signaling.

In the operation 403, the terminal receives the configuration signaling transmitted by the access network device.

Correspondingly, the terminal receives the configuration signaling transmitted by the access network device, and obtains the configuration parameter of the periodic uplink information/signal in the configuration signaling.

In the operation 404, the terminal determines a target transmission unit according to the configuration parameter.

Optionally, the terminal determines the target transmission unit according to the transmission period and the offset, or the terminal determines the target transmission unit according to the transmission period, the offset and the physical resource indication.

In a schematic example, the terminal obtains the transmission period "2 ms" and offset "3" in the configuration signaling according to the received configuration signaling, and then the terminal determines the target transmission unit for present transmission to be a "third" subframe in a radio frame.

In the operation 405, the access network device determines the target transmission unit according to the configuration parameter.

Optionally, the access network device, after determining the configuration parameter of the periodic uplink information/signal in the operation 401, determines the target transmission unit according to the configuration parameter. A related determination operation may refer to the operation 404.

Optionally, the operation 405 may be executed concurrently with the operation 402 or the operation 403 or the operation 404, which will not be limited in the embodiment.

In the operation 406, the terminal transmits or cancels target periodic uplink information/signal according to the number of an uplink symbol in the target transmission unit.

Optionally, the terminal determines whether the target transmission unit is required to transmit the target periodic uplink information/signal or not according to the number of the uplink symbol in the target transmission unit; if NOT required, the terminal cancels it, and if required, the terminal determines a transmission manner corresponding to the target transmission unit and transmits the target periodic uplink information/signal to the access network device according to the transmission manner.

Schematically, the number of the uplink symbol in the target transmission unit ranges from 0 to 7.

Optionally, the target periodic uplink information/signal includes periodic CSI, and when the terminal transmits the periodic CSI over a PUCCH according to the transmission period, an adopted PUCCH format is any one of PUCCH format 2, PUCCH format 2a and PUCCH format 2b.

In a schematic example, the configuration parameter received by the terminal includes: a transmission period "5 ms", an offset "3", a physical resource indication "index A", a CSI feedback mode "Type 10" and a transmission mode "Mode 4", then the terminal determines a target transmission unit B according to the transmission period "5 ms", the offset "3" and the physical resource indication "index A" and determines that the target periodic uplink information/signal is required to be transmitted according to the number of an uplink symbol in the target transmission unit B, and the terminal transmits CRI information to the access network device every 5 ms according to a closed-loop spatial multiplexing mode.

In the operation 407, the access network device receives or does not receive the target periodic uplink information/signal according to the number of the uplink symbol in the target transmission unit.

Correspondingly, the access network device determines whether to receive the target periodic uplink information/signal or not according to the number of the uplink symbol in the target transmission unit.

From the above, according to the embodiment of the disclosure, the terminal receives the configuration signaling transmitted by the access network device, determines the target transmission unit according to the configuration parameter in the configuration signaling and transmits or cancels the target periodic uplink information/signal according to the number of the uplink symbol in the target transmission unit. In such a manner, when the transmission unit configured to transmit the target periodic uplink information/signal has a dynamically changing frame structure, the terminal may determine whether to transmit or cancel the target periodic uplink information/signal according to the number of the uplink symbol in the target transmission unit, and responsive to determining that the target periodic uplink information/signal is required to be sent, selects a transmission manner for the target periodic uplink information/signal and transmits the target periodic uplink information/signal according to the transmission manner. Therefore, a probability that the terminal effectively feeds back the periodic uplink information/signal is improved.

For the operation 405, several possible schemes for transmitting periodic uplink information/signal are provided in the disclosure, specifically as follows.

First Transmission Scheme for Periodic Uplink Information/Signal

When the target transmission unit is a normal uplink subframe or a normal uplink slot, a terminal transmits a target periodic uplink information/signal in the target transmission unit according to the configuration parameter; and correspondingly, the access network device receives the target periodic uplink information/signal transmitted by the terminal.

Optionally, the normal uplink subframe includes no downlink symbol, namely symbol types in the normal uplink subframe are all uplink symbols; and the normal uplink slot includes no downlink symbol, namely symbol types in the normal uplink slot are all uplink symbols. the number of an uplink symbol in the normal uplink subframe or the normal uplink slot is not limited in the embodiment.

Descriptions will be made below only with the condition that the target transmission unit is a slot (the normal uplink slot includes 7 uplink symbols) as an example.

Figure 5:
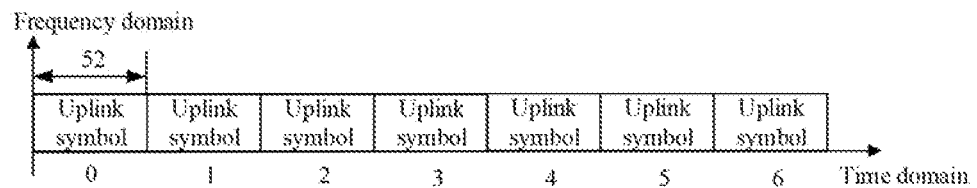
FIG. 5 is a schematic diagram of a target transmission unit involved in a first transmission scheme for periodic uplink information/signal according to another exemplary embodiment of the disclosure.

In a schematic example, as shown in FIG. 5, the target transmission unit includes 7 symbols ("0th" to "6th"), and the 7 symbols are all uplink symbols 52, namely the target transmission unit is a normal uplink slot. Then, the terminal transmits the target periodic uplink information/signal in the 7 uplink symbols 52 of the target transmission unit according to the configuration parameter.

Second Transmission Scheme for Periodic Uplink Information/Signal

When the number of the uplink symbol in the target transmission unit is more than or equal to a first threshold, the target periodic uplink information/signal is transmitted over the target transmission unit according to the configuration parameter; and correspondingly, the access network device receives the target periodic uplink information/signal transmitted by the terminal.

Optionally, the first threshold is a positive integer smaller than 7. Schematically, a value of the first threshold is 5.

Figure 6:
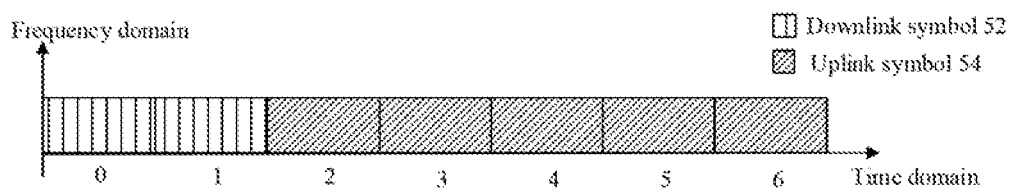
FIG. 6 is a schematic diagram of a target transmission unit involved in a second transmission scheme for periodic uplink information/signal according to another exemplary embodiment of the disclosure.

In a schematic example, as shown in FIG. 6, the target transmission unit includes 2 downlink symbols 52 and 5 uplink symbols 54, and when the terminal determines that the uplink symbol quantity "5" of the target transmission unit is equal to the first threshold "5", the terminal transmits the target periodic uplink information/signal in the 5 uplink symbols 54 of the target transmission unit according to the configuration parameter.

Third Transmission Scheme for Periodic Uplink Information/Signal

When the target transmission unit includes no uplink symbol, the target periodic uplink information/signal is cancelled; and correspondingly, the access network device does not receive the target periodic uplink information/signal.

Optionally, cancelling the target periodic uplink information/signal refers to that the terminal does not transmit the target periodic uplink information/signal to the access network device. Optionally, the terminal further clears the target periodic uplink information/signal from a cache.

Fourth Transmission Scheme for Periodic Uplink Information/Signal

When the number of the uplink symbol in the target transmission unit is larger than 0 and smaller than a second threshold, the target periodic uplink information/signal is cancelled; and correspondingly, the access network device does not receive the target periodic uplink information/signal.

Optionally, the second threshold is a positive integer smaller than 5. Schematically, a value of the second threshold is 4.

For example, the target transmission unit includes 3 uplink symbols, and when the terminal determines that the uplink symbol quantity "3" of the target transmission unit is larger than 0 and smaller than the second threshold "4", the terminal cancels the target periodic uplink information/signal.

Fifth Transmission Scheme for Periodic Uplink Information/Signal

When the target transmission unit includes no uplink symbol, a first first-type transmission unit within a preset period after or from the target transmission unit is determined, and the target periodic uplink information/signal is transmitted through at least one uplink symbol in the first first-type transmission unit according to the configuration parameter; and correspondingly, the access network device receives the target periodic uplink information/signal transmitted by the terminal.

Optionally, transmission units have two types: first-type transmission units and second-type transmission units. The first-type transmission unit includes any one of: a normal uplink subframe, a normal uplink slot, a transmission unit of which an uplink symbol quantity is larger than a fourth threshold, and a transmission unit of which an uplink symbol quantity is equal to the fourth threshold. The second-type transmission unit includes a transmission unit that is not a first-type transmission unit. Schematically, the fourth threshold is a positive integer larger than 3.

Optionally, the preset period is pre-configured by the access network apparatus or predefined in a protocol. Schematically, the preset period is 3 ms.

Figure 7:
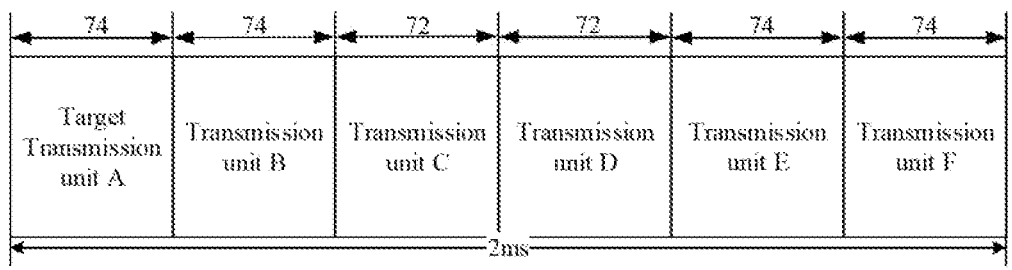
FIG. 7 is a schematic diagram of a target transmission unit involved in a fifth transmission scheme for periodic uplink information/signal according to another exemplary embodiment of the disclosure.

In a schematic example, the preset period is 3 ms. As shown in FIG. 7, transmission units within 3 ms starting from the target transmission unit A are sequentially the target transmission unit A, a transmission unit B, a transmission unit C, a transmission unit D, a transmission unit E and a transmission unit F. Both of the transmission unit A and the transmission unit D include no uplink symbol, the transmission unit B is a normal uplink slot (including 7 uplink symbols), the transmission unit C is a transmission unit of which an uplink symbol quantity is equal to the fourth threshold "4", and both of the transmission unit E and the transmission unit F are transmission units of which uplink symbol quantities are smaller than the fourth threshold "4" respectively. Therefore, both of the transmission unit B and the transmission unit C are first-type transmission units 72, and the target transmission unit A, the transmission unit D, the transmission unit E and the transmission unit F are second-type transmission units 74. When the terminal determines that the target transmission unit A includes no uplink symbol, the terminal determines that the first first-type transmission unit within 3 ms starting from the target transmission unit A is the transmission unit B. The terminal transmits the target periodic uplink information/signal in the 7 uplink symbols of the transmission unit B according to the configuration parameter.

Sixth Transmission Scheme for Periodic Uplink Information/Signal

When the number of the uplink symbol in the target transmission unit is larger than 0 and smaller than a third threshold, the first first-type transmission unit within the preset period from or after the target transmission unit is determined, and the target periodic uplink information/signal is transmitted through at least one uplink symbol of the first first-type transmission unit according to the configuration parameter.

For example, a value of the third threshold is 4, the target transmission unit includes 3 uplink symbols, and when the terminal determines that the uplink symbol quantity "3" of the target transmission unit is larger than 0 and smaller than the third threshold "4", the terminal determines the first first-type transmission unit within the preset period from or after the target transmission unit and transmits the target periodic uplink information/signal through at least one uplink symbol of the first first-type transmission unit according to the configuration parameter.

It is to be noted that related details about how the terminal determines the first first-type transmission unit and how to transmit the target periodic uplink information/signal may refer to related descriptions in the fifth transmission scheme for periodic uplink information/signal and elaborations are omitted herein.

Seventh Transmission Scheme for Periodic Uplink Information/Signal

When the number of the uplink symbol in the target transmission unit is larger than 0 and smaller than a fifth threshold, an information subset of the target periodic uplink information/signal is transmitted through at least one uplink symbol in the target transmission unit according to the configuration parameter.

Optionally, when the periodic uplink information/signal includes the periodic CSI, the information subset includes at least one of the following sub information: CRI information, RI information, wideband CQI information, wideband PMI information and first PMI information.

Optionally, the information subset further includes at least one of the following sub information: sub-band CQI information, second PMI information and PTI information. The types of the sub information in the information subset are not limited in the embodiment.

For example, a value of the fifth threshold is 3, the target transmission unit includes 2 uplink symbols, and when the terminal determines that the uplink symbol quantity "2" of the target transmission unit is larger than 0 and smaller than the fifth threshold "3", the terminal transmits the CRI information in the target periodic uplink information/signal through at least one uplink symbol of the target transmission unit according to the configuration parameter.

Eighth Transmission Scheme for Periodic Uplink Information/Signal

1: The terminal determines a time-frequency resource for transmitting the target periodic uplink information/signal according to the number of the uplink symbol in the target transmission unit and the configuration parameter.

Since the number of the uplink symbol in the target transmission unit may dynamically change, when the number of the uplink symbol in the target transmission unit is smaller than or larger than a predetermined threshold, the terminal may regulate the time-frequency resource configured to transmit the target periodic uplink information/signal to ensure that the terminal may transmit the target periodic uplink information/signal on the time-frequency resource according to the configuration parameter, which avoids the fact that the time-frequency resource is too small to transmit the target periodic uplink information/signal and also avoids the resource waste caused by the fact that the time-frequency resource configured to transmit the target periodic uplink information/signal is too large.

Optionally, a normal time-frequency resource configured to transmit the target periodic uplink information/signal usually includes A*B Resource Elements (REs), and when the uplink symbol quantity C of the target transmission unit (including C*D REs) is smaller than or larger than the predetermined threshold, the terminal regulates the number of subcarriers occupied in the frequency domain to ensure that an absolute difference value between the number of REs in the time-frequency resource configured to transmit the target periodic uplink information/signal and the number of the REs in the normal time-frequency resource is smaller than a difference threshold.

In a possible implementation, the terminal pre-stores a mapping relationship between an uplink symbol quantity and a time-frequency resource amount. Optionally, the mapping relationship is predefined in a communication protocol, and the mapping relationship is a mapping relationship shown in Table 5. The time-frequency resource amount is A*B, and is configured to represent that the time-frequency resource includes A*B REs, namely the time-frequency resource includes A symbols in the time domain and includes B subcarriers in the frequency domain.

TABLE 5

| Uplink symbol quantity | Time-frequency resource amount |
|---|---|
| 1 | 1 * 84 |
| 2 | 2 * 42 |
| 3 | 3 * 28 |
| 4 | 4 * 21 |
| 5 | 5 * 17 |
| 6 | 6 * 14 |
| 7 | 7 * 12 |

For example, the configuration parameter includes the transmission period "5 ms", the offset "3" and the physical resource indication "index A", and the target transmission unit B includes totally 6*12 REs, the uplink symbol quantity being 6 and the subcarrier amount being 12. On the basis of Table 5, the terminal determines that the amount of time-frequency resources for transmitting the target periodic uplink information/signal is 6*14 according to the uplink symbol quantity "6" of the target transmission unit B. That is, the terminal regulates the time-frequency resource configured to transmit the target periodic uplink information/signal to be 6*14 REs.

It is to be noted that the mapping relationship shown in Table 5 is only schematic and the terminal may also pre-store a mapping relationship between an uplink symbol quantity and a subcarrier amount. The mapping relationship between the uplink symbol quantity and the time-frequency resource amount or the subcarrier amount and a manner for setting the mapping relationship are not limited in the embodiment.

In another possible implementation, the terminal calculates the time-frequency resource for transmitting the target periodic uplink information/signal through a preset formula according to the configuration parameter and the number of the uplink symbol in the target transmission unit.

For example, the configuration parameter includes the transmission period "5 ms", the offset "3" and the physical resource indication "index A", and in the target transmission unit B, the uplink symbol quantity is 6 and the subcarrier amount is 12. The terminal calculates the time-frequency resource amount 84 (the corresponding subcarrier amount is 14) through the preset format according to the uplink symbol quantity "6" of the target transmission unit B, namely the terminal determines that the time-frequency resource configured to transmit the target periodic uplink information/signal is a time-frequency resource S, the uplink symbol quantity being 6 and the subcarrier amount being 14 in the time-frequency resource. 2: The terminal transmits the target periodic uplink information/signal on the time-frequency resource according to the configuration parameter.

For example, the terminal transmits the target periodic uplink information/signal on the time-frequency resource of which the time-frequency resource amount is 6*14 every 5 ms.

Ninth Transmission Scheme for Periodic Uplink Information/Signal

1: The terminal determines the time-frequency resource for transmitting the target periodic uplink information/signal according to the number of an uplink symbol in the first first-type transmission unit and configuration information.

2: The terminal transmits the target periodic uplink information/signal on the time-frequency resource according to the configuration parameter.

It is to be understood that a difference between the ninth transmission scheme and the eighth transmission scheme is that: the uplink symbol in the eighth transmission scheme belongs to the "target transmission unit" and the uplink symbol in the ninth transmission scheme belongs to the "first-type transmission unit". Related details may refer to related descriptions in the eighth transmission scheme and elaborations are omitted herein.

It is to be understood that, for the operation 406, the nine embodiments corresponding to the nine transmission schemes for periodic uplink information/signal are also applied to an access network device side. Related details may refer to related descriptions in the nine embodiments and elaborations are omitted herein.

It is to be noted that the thresholds (any one of the first threshold, the second threshold, the third threshold, the fourth threshold and the fifth threshold) involved in each embodiment are pre-configured by an access network device or predefined in a communication protocol. A determination manner and value of each threshold are not limited in the embodiment.

It is also to be noted that, in the nine embodiments, any two embodiments may be combined for implementation, any three embodiments may be combined for implementation or n (n is a positive integer) embodiments may be combined for implementation, which is apparent to those skilled in the art according to each embodiment. Manners for combined implementation of the embodiments will not be repeatedly elaborated one by one in the embodiment of the disclosure. The manner for combined implementation of the fifth embodiment and the ninth embodiment will be elaborated only with a specific schematic example, specifically as follows.

Figure 8:
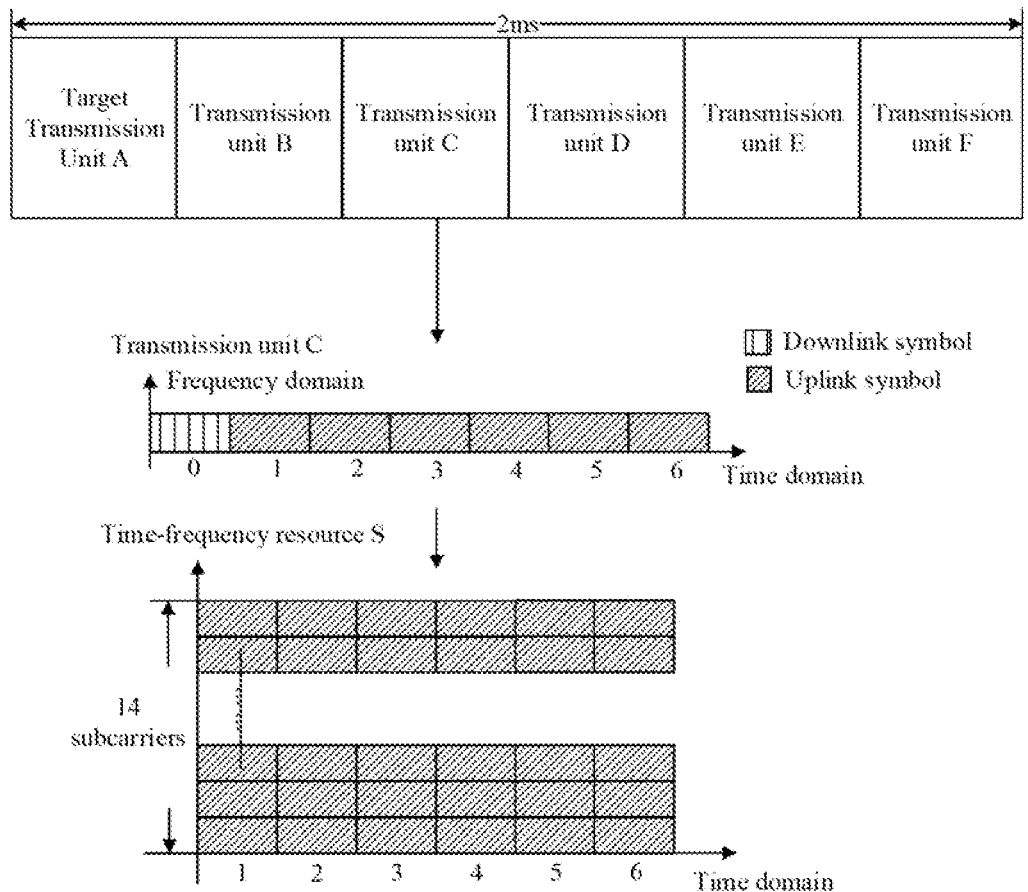
FIG. 8 is a schematic diagram of a principle involved in a periodic uplink information/signal transmission method according to another exemplary embodiment of the disclosure.

As shown in FIG. 8, when the terminal determines that the target transmission unit A includes no uplink symbol, the terminal sequentially judges whether a transmission unit that is a first-type transmission unit exists within 3 ms from the target transmission unit A or not. Since the target transmission unit A includes no uplink symbol, the terminal determines that the target transmission unit A is not a first-type transmission unit. Since the transmission unit B includes 1 downlink symbol and 6 uplink symbols, the terminal determines that the transmission unit B is the first first-type transmission unit according to the fact that the number of the uplink symbol in the transmission unit B is equal to the fourth threshold "6". The terminal calculates the time-frequency resource 84 of the time-frequency resource S through the preset formula according to the configuration information (the transmission period "5 ms", the offset "3" and the physical resource indication "index A") and the uplink symbol quantity "6" of the transmission unit B, namely the terminal determines that the time-frequency resource configured to transmit the target periodic uplink information/signal is the time-frequency resource S (including 84 REs), the number of uplink symbols occupied by the time-frequency resource S in the time domain being 6 and the number of subcarriers occupied in the frequency domain being 14. The configuration parameter further includes a CSI feedback mode "Type 10" and a transmission mode "Mode 4". Therefore, the terminal determines that the target periodic uplink information/signal is required to be transmitted according to the configuration parameter and transmits the CRI information on the time-frequency resource S every 5 ms according to the closed-loop spatial multiplexing mode.

From the above, according to the embodiments of the disclosure, a terminal receives configuration signaling from an access network device, determines a target transmission unit according to a configuration parameter in the configuration signaling and transmits or cancels the target periodic uplink information/signal according to the number of an uplink symbol in the target transmission unit. In such a manner, when the transmission unit configured to transmit the target periodic uplink information/signal has a dynamically changing frame structure, the terminal may determine whether to transmit or cancel the target periodic uplink information/signal according to the number of the uplink symbol in the target transmission unit, and responsive to determining that the target periodic uplink information/signal is required to be sent, selects a transmission manner for the target periodic uplink information/signal and transmits the target periodic uplink information/signal according to the transmission manner. Therefore, a probability that the terminal effectively feeds back the periodic uplink information/signal is improved.

According to the embodiment of the disclosure, when the target transmission unit includes no uplink symbol or the uplink symbol quantity is larger than 0 and smaller than the third threshold, the first first-type transmission unit within the preset period from or after the target transmission unit is determined, and the target periodic uplink information/signal is transmitted through at least one uplink symbol of the first first-type transmission unit according to the configuration parameter. In such a manner, when the target transmission unit may not be configured to transmit the target periodic uplink information/signal, the terminal may transmit the target periodic uplink information/signal through at least one uplink symbol of the determined first first-type transmission unit. Therefore, the condition that the target periodic uplink information/signal is cancelled is avoided, and the access network device may timely obtain the target periodic uplink information/signal fed back by the terminal.

According to the embodiments of the disclosure, when the number of the uplink symbol in the target transmission unit is larger than 0 and smaller than the fifth threshold, the information subset of the target periodic uplink information/signal is transmitted through at least one uplink symbol of the target transmission unit according to the configuration parameter. Since the information subset includes at least one of the CRI information, the RI information, the CQI information, the wideband PMI information and the first PMI information, the terminal still can transmit part of information related to the target periodic uplink information/signal to the access network device, thereby avoiding the resource waste caused by the fact that the number of the uplink symbol in the target transmission unit is too small and thus the target periodic uplink information/signal is cancelled.

The below are the apparatus embodiments of the embodiments of the disclosure. and the parts which are not elaborated in the apparatus embodiments may refer to technical details disclosed in the method embodiments.

Figure 9:
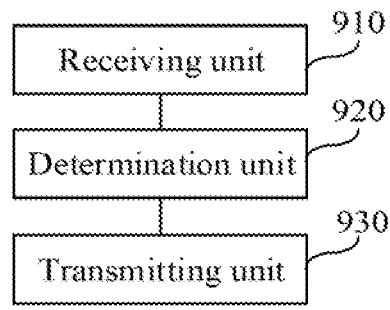
FIG. 9 is a structure diagram of a periodic uplink information/signal transmission apparatus according to an exemplary embodiment of the disclosure.

Referring to FIG. 9, a structure diagram of a periodic uplink information/signal transmission apparatus according to an exemplary embodiment of the disclosure is shown. The periodic uplink information/signal transmission apparatus may be implemented into all or part of a terminal through software, hardware and a combination of the two. The periodic uplink information/signal transmission apparatus includes a receiving unit 910, a determination unit 920 and a transmitting unit 930.

The receiving unit 910 is configured to execute functions of the operation 403 and at least one other explicit or implicit receiving operation.

The determination unit 920 is configured to execute functions of the operation 404 and at least one other explicit or implicit determination operation.

The transmitting unit 930 is configured to execute functions of the operation 406 and at least one other explicit or implicit transmission operation.

Figure 10:
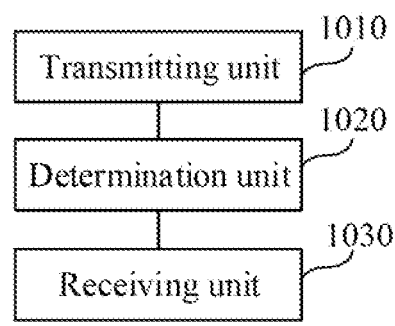
FIG. 10 is a structure diagram of a periodic uplink information/signal transmission apparatus according to another exemplary embodiment of the disclosure.

Referring to FIG. 10, a structure diagram of a periodic uplink information/signal transmission apparatus according to an exemplary embodiment of the disclosure is shown. The periodic uplink information/signal transmission apparatus may be implemented into all or part of an access network device through software, hardware and a combination of the two. The periodic uplink information/signal transmission apparatus includes a transmitting unit 1010, a determination unit 1020 and a receiving unit 1030.

The transmitting unit 1010 is configured to execute functions of the operation 402 and at least one other explicit or implicit transmission operation.

The determination unit 1020 is configured to execute functions of the operation 405 and at least one other explicit or implicit determination operation.

The receiving unit 1030 is configured to execute functions of the operation 407 and at least one other explicit or implicit receiving operation.

An embodiment of the disclosure also provides an uplink data system, which may include a terminal and an access network device.

The terminal may include the periodic uplink information/signal transmission apparatus provided in FIG. 9, and the access network device may include the periodic uplink information/signal transmission apparatus provided in FIG. 10.

Or, the terminal may be the terminal provided in FIG. 3A, and the access network device may be the access network device provided in FIG. 3B.

Those skilled in the art may realize that, in one or more abovementioned examples, the functions described in the embodiments of the disclosure may be realized through hardware, software, firmware or any combination thereof. When being realized through the software, these functions may be stored in a computer-readable medium or transmitted as one or more instructions or codes in the computer-readable medium. The computer-readable medium includes a computer storage medium and a communication medium, and the communication medium includes any medium for transmitting a computer program from one place to another place. The storage medium may be any available medium accessible for a universal or dedicated computer.

The above are only the preferred embodiments of the disclosure and not intended to limit the disclosure. Any modifications, equivalent replacements, improvements and the like made within the spirit and principle of the disclosure shall fall within the scope of protection of the disclosure.

The invention claimed is:

1. A method for uplink information transmission, implemented by a terminal, comprising:
receiving configuration signaling, where the configuration signaling is used for indicating a configuration parameter of uplink information; and
when the number of uplink symbols in a transmission unit for transmitting the uplink information is smaller than a first numerical value, not transmitting the uplink information, where the first numerical value is a positive integer,
wherein the method further comprises:
when the transmission unit comprises no uplink symbol, determining a first first-type transmission unit within a preset period after or from the transmission unit, and transmitting the uplink information through at least one uplink symbol in the first first-type transmission unit according to the configuration parameter.

2. The method of claim 1, wherein the first numerical value is configured by a network device.

3. The method of claim 1, wherein the uplink information is transmitted in a physical uplink control channel (PUCCH) or a physical uplink sharing channel (PUSCH).

4. The method of claim 1, wherein the transmission unit is a subframe or a slot or at least one symbol.

5. The method claim 1, wherein the configuration parameter is used for indicating at least one of: an offset and a physical resource.

6. The method of claim 1, further comprising:
when the number of uplink symbols in the transmission unit for transmitting the uplink information is larger than or equal to a second numerical value, transmitting the uplink information.

7. The method of claim 1, wherein the first-type transmission unit comprises one of:
a normal uplink subframe, a normal uplink slot, a transmission unit of which an uplink symbol quantity is larger than a threshold, and a transmission unit of which an uplink symbol quantity is equal to the threshold.

8. A terminal for uplink information transmission, comprising: a processor, a transmitter and a receiver, the transmitter and the receiver being configured to transmit and receive information under control of the processor,
wherein the receiver is configured to receive configuration signaling, where the configuration signaling is used for indicating a configuration parameter of uplink information; and
the processor is configured to, when the number of uplink symbols in a transmission unit for transmitting the uplink information is smaller than a first numerical value, control the transmitter to not transmit the uplink information, where the first numerical value is a positive integer,
wherein the processor is further configured to, when the transmission unit comprises no uplink symbol, determine a first first-type transmission unit within a preset period after or from the transmission unit, and control the transmitter to transmit the uplink information through at least one uplink symbol in the first first-type transmission unit according to the configuration parameter.

9. The terminal of claim 8, wherein the uplink information is transmitted in a physical uplink control channel (PUCCH) or a physical uplink sharing channel (PUSCH).

10. The terminal of claim 8, wherein the transmission unit is a subframe or a slot or at least one symbol.

11. The terminal of claim 8, wherein the configuration parameter is used for indicating at least one of an offset and a physical resource.

12. The terminal of claim 8, wherein the transmitter is configured to:
when the number of uplink symbols in the transmission unit for transmitting the uplink information is larger than or equal to a second numerical value, transmit the uplink information.

13. The terminal of claim 8, wherein the first numerical value is configured by a network device.

14. A network device for uplink information transmission, comprising: a processor, a transmitter and a receiver, wherein the transmitter is configured to send configuration signaling, wherein the configuration signaling is used for indicating a configuration parameter of uplink information; and the processor is configured to, when the number of uplink symbols in a transmission unit for transmitting the uplink information is smaller than a first numerical value, control the receiver to not receive the uplink information in the transmission unit, where the first numerical value is a positive integer, wherein the processor is further configured to, when the transmission unit comprises no uplink symbol, determine a first first-type transmission unit within a preset period after or from the transmission unit, and control the receiver to receive the uplink information through at least one uplink symbol in the first first-type transmission unit according to the configuration parameter.

15. The network device of claim 14, wherein the processor is further configured to configure the first numerical value.

16. The network device of claim 14, wherein the uplink information is received in a physical uplink control channel (PUCCH) or a physical uplink sharing channel (PUSCH).

17. The network device of claim 14, wherein the transmission unit is a subframe or a slot or at least one symbol.

18. The network device of claim 14, wherein the configuration parameter is used for indicating at least one of: an offset and a physical resource.

19. The network device of claim 14, wherein the receiver is configured to:

when the number of uplink symbols in a transmission unit for transmitting the uplink information is larger than or equal to a second numerical value, receive the uplink information in the transmission unit.

20. The network device of claim 14, wherein the first-type transmission unit comprises one of:

a normal uplink subframe, a normal uplink slot, a transmission unit of which an uplink symbol quantity is larger than a threshold, and a transmission unit of which an uplink symbol quantity is equal to the threshold.

* * * * *